United States Patent
Mueller

(10) Patent No.: US 7,503,511 B2
(45) Date of Patent: Mar. 17, 2009

(54) PINTLE INJECTOR TIP WITH ACTIVE COOLING

(75) Inventor: Thomas J. Mueller, Long Beach, CA (US)

(73) Assignee: Space Exploration Technologies, Hawthorne, CA (US)

( * ) Notice: Subject to any disclaimer, the term of this patent is extended or adjusted under 35 U.S.C. 154(b) by 371 days.

(21) Appl. No.: 11/198,053

(22) Filed: Aug. 4, 2005

(65) Prior Publication Data

US 2009/0007543 A1 Jan. 8, 2009

Related U.S. Application Data

(60) Provisional application No. 60/607,877, filed on Sep. 8, 2004.

(51) Int. Cl.
B05B 7/10 (2006.01)
B05B 7/04 (2006.01)

(52) U.S. Cl. ............... 239/424.5; 239/424; 239/425; 239/426; 239/433; 239/434; 60/258; 60/740; 60/732

(58) Field of Classification Search ........... 239/399, 239/424, 425.5, 425, 426, 433, 434; 60/258, 60/259, 740, 732
See application file for complete search history.

(56) References Cited

U.S. PATENT DOCUMENTS

| | | |
|---|---|---|
| 2,962,858 A | 12/1960 | Africano et al. |
| 3,093,157 A | 6/1963 | Aitken et al. |
| 3,200,589 A | 8/1965 | Mower et al. |
| 3,205,656 A | 9/1965 | Elverum, Jr. |
| 3,234,731 A | 2/1966 | Dermody et al. |
| 3,372,543 A | 3/1968 | Baker |
| 3,421,700 A | 1/1969 | Seamans, Jr. |
| 3,462,950 A | 8/1969 | Chevalaz |
| 3,699,772 A | 10/1972 | Elverum, Jr. |
| 3,948,042 A | 4/1976 | Beardsley et al. |
| 3,979,088 A | 9/1976 | McCormick |
| 3,998,051 A | 12/1976 | Ziegler |
| 4,058,263 A | 11/1977 | Trenschel |

(Continued)

*Primary Examiner*—Len Tran
*Assistant Examiner*—James S Hogan
(74) *Attorney, Agent, or Firm*—Irell & Manella LLP

(57) ABSTRACT

A bi-propellant rocket engine may include a primary propellant flowing in a central passageway, a secondary propellant flowing in a secondary passageway generally coaxial with central passageway and a pintle tip having a central chamber sidewall coaxial with the primary passageway and surrounding a central chamber, the central chamber sidewall having a first plurality of apertures there through so that some of the primary propellant exits the central chamber transverse to the flow of the secondary propellant in the secondary passageway. The pintle tip may have a secondary chamber sidewall, substantially thicker than the primary chamber sidewall, surrounding a secondary chamber downstream of and in fluid communication with the primary chamber, the secondary chamber sidewall having a second plurality of apertures there through so that some of the primary propellant exits the secondary chamber transverse to the flow of the secondary propellant in the secondary passageway. The pintle tip may have an end wall generally traverse to the flow of the primary propellant in the central passageway and adjacent the secondary chamber sidewall so that the flow of primary propellant through the secondary chamber sidewall cools a downstream face of the end wall during combustion of the mixed propellants adjacent the downstream face of the end wall. The pintle tip may be used for mixing a first liquid with a second liquid.

4 Claims, 2 Drawing Sheets

U.S. PATENT DOCUMENTS

| | | |
|---|---|---|
| 4,078,495 A | 3/1978 | Ledden, Jr. |
| 4,089,162 A | 5/1978 | Silvestri |
| 4,099,893 A | 7/1978 | Coffman |
| 4,099,894 A | 7/1978 | Indra |
| 4,206,594 A * | 6/1980 | Elverum, Jr. .................. 60/258 |
| 4,215,533 A | 8/1980 | Silvestri |
| 4,217,132 A | 8/1980 | Burge et al. |
| 4,429,708 A * | 2/1984 | Strueh .................. 137/115.08 |
| 4,539,811 A | 9/1985 | Dale et al. |
| 4,586,443 A | 5/1986 | Burge et al. |
| 4,604,052 A | 8/1986 | Brown et al. |
| 4,644,878 A | 2/1987 | Nodd et al. |
| 4,660,478 A | 4/1987 | Sheppard et al. |
| 4,685,404 A | 8/1987 | Sheppard et al. |
| 4,702,335 A | 10/1987 | Cage et al. |
| 4,782,660 A | 11/1988 | Domyan et al. |
| 4,846,317 A | 7/1989 | Hudgens |
| 4,873,930 A | 10/1989 | Egense et al. |
| 4,894,986 A | 1/1990 | Etheridge |
| 4,928,491 A | 5/1990 | Lindsay et al. |
| 5,265,415 A | 11/1993 | Cox, Jr. |
| 5,282,357 A | 2/1994 | Sackheim |
| 5,394,690 A | 3/1995 | Arszman et al. |
| 5,417,049 A | 5/1995 | Sackheim et al. |
| 5,572,865 A | 11/1996 | Sackheim et al. |
| 5,667,167 A | 9/1997 | Kistler |
| 5,704,551 A * | 1/1998 | Schmidt et al. ............. 239/403 |
| 5,817,968 A | 10/1998 | Wilkinson |
| 5,927,653 A | 7/1999 | Mueller et al. |
| 6,016,658 A * | 1/2000 | Willis et al. .................. 60/737 |
| 6,185,927 B1 | 2/2001 | Chrones et al. |
| 6,212,878 B1 * | 4/2001 | Adzhian et al. ............... 60/258 |
| 6,363,724 B1 * | 4/2002 | Bechtel et al. ................ 60/737 |
| 6,591,603 B2 | 7/2003 | Dressler et al. |
| 6,786,047 B2 * | 9/2004 | Bland et al. .................. 60/737 |
| 2002/0179776 A1 | 12/2002 | Mueller et al. |
| 2005/0061919 A1 | 3/2005 | Mueller et al. |

\* cited by examiner

PINTLE INJECTOR TIP WITH ACTIVE COOLING

CROSS REFERENCE TO RELATED APPLICATION(S)

The present invention claims the priority of U.S. provisional patent application Ser. No. 60/607,877, filed Sep. 8, 2004.

BACKGROUND OF THE INVENTION

1. Field of the Invention

The present invention relates to rocket engines and in particular to pintle injector tips used in liquid rocket engines.

2. Background of the Prior Art

Rocket engines using more than one propellant, such as bipropellant rocket engines using two propellants, require techniques for efficiently combining the propellants. Convention techniques include the use of coaxial pintle injectors, as shown for example in U.S. Pat. Nos. 3,205,656, 3,699,772 and 4,206,594, Elverum, incorporated herein in their entirety by this reference. In such conventional pintle tips, a center or inner propellant, such as liquid oxygen or LOX, flows through a central passageway and is caused by a pintle tip to radiate outwardly through a series of apertures perpendicular to the axis of the central passageway to mix with an outer propellant, such as kerosene, flowing coaxially along the outside of the central passageway. The inner propellant is directed outward perpendicularly from the central passageway generally in the form of a set of spokes of a wheel. Various other propellants may be used and the oxidizing propellant, such as LOX, may also be caused to flow coaxially around the fuel propellant, such as kerosene.

Pintle tips are conventionally fabricated from copper or nickel and may be formed by closing the end of the central passageway, typically by fastening a separate pintle tip to a cylindrical passageway using screw threads. Conventional apertures include one or more sets of shaped passageways, slightly upstream of the closed end of the pintle tip, leading from the central passageway through a sidewall to the outer circumference of the sidewall. Such conventional pintle injector tips may utilize diverters, typically in the shape of an inverted cone mounted or formed at the end of the central passageway at the pintle tip, which are intended to cause the central propellant in the central passageway to be deflected smoothly towards the apertures for mixing outside the passageway with the outer propellant.

The downstream end or face of the pintle tip is typically adjacent the point of combustion of the combined propellants and is therefore subject to substantial heat. As a result, conventional pintle injector tips often use ablative surfaces on the downstream face of the pintle injector tip to protect the downstream face from heat damage.

Reusable rockets are very desirable designs from a cost reduction standpoint. Pintle injectors with removable pintle injector tips are desirable for use in such reusable rockets, as well as in other rocket engine and station keeping engines, because of their relatively low cost, convenience of reuse and the substantial improvement in flame or combustion stability available with coaxial pintle injector designs. Conventional coaxial pintle injector tips are somewhat limited in the convenience of their use and reuse, for example, by need for the ablative layer covering the downstream face of the tip that must be replaced after use due to erosion and charring of the ablative material. What is needed is an improved pintle tip for coaxial pintle injector engines.

SUMMARY OF THE DISCLOSURE

A bi-propellant rocket engine is disclosed having a primary propellant flowing in a central passageway, a secondary propellant flowing in a secondary passageway generally coaxial with central passageway and a pintle tip having a central chamber sidewall coaxial with the primary passageway and surrounding a central chamber, the central chamber sidewall having a first plurality of apertures there through so that some of the primary propellant exits the central chamber transverse to the flow of the secondary propellant in the secondary passageway, the pintle tip having a secondary chamber sidewall, substantially thicker than the primary chamber sidewall, surrounding a secondary chamber downstream of and in fluid communication with the primary chamber, the secondary chamber sidewall having a second plurality of apertures there through so that some of the primary propellant exits the secondary chamber transverse to the flow of the secondary propellant in the secondary passageway, the pintle tip having an end wall generally traverse to the flow of the primary propellant in the central passageway and adjacent the secondary chamber sidewall so that the flow of primary propellant through the secondary chamber sidewall cools a downstream face of the end wall during combustion of the mixed propellants adjacent the downstream face of the end wall.

The end wall may have a third plurality of apertures there through so that some of the primary propellant exits the secondary chamber through the downstream face of the end wall to cool the end wall and cause a zone of primary propellant concentration downstream of the downstream face of the end wall to further cool the end wall. The end wall may be coated with a thermal barrier. The flow of primary propellant through the first plurality of apertures may constitute about 60% to 80% of the total flow of primary propellant through the primary passageway. The flow of primary propellant through the second plurality of apertures may constitute about 15% to 30% of the total flow, while the flow of primary propellant through the third plurality of apertures may constitute about 5% to 10% of the total flow. The third plurality of apertures may include one or more doublets or triplets while the first plurality of apertures may be generally rectangular.

A pintle tip is disclosed having a central chamber having a first plurality of apertures there through so that a first liquid in the pintle tip exits radially to mix with a second liquid surrounding the pintle tip, a secondary chamber downstream of the central chamber having a second plurality of apertures there through so that the first liquid exits radially from the pintle tip to mix with second liquid and an end wall downstream of the secondary chamber. The end wall may have a third plurality of apertures there through so that some of the first liquid tip exits the secondary chamber through a downstream face of the end wall to mix with second liquid.

The flow of the first liquid through the third plurality of apertures may cause a zone of concentration of the first liquid downstream of the downstream face of the end wall. The flow of the first liquid through the first plurality of apertures may be about 60% to 80% of the total flow. The flow of the first liquid through the second plurality of apertures may constitute about 15% to 30% of the total flow and the flow of first liquid through the third plurality of apertures may constitute about 5% to 10% of the total flow through the pintle tip. The first plurality of apertures may be generally rectangular in shape while the second plurality of apertures may be generally circular in shape.

BRIEF DESCRIPTION OF THE DRAWINGS

The objects, features and advantages of the present invention will be apparent from the following detailed description of the preferred embodiment(s) of the invention with references to the drawings in which.

DETAILED DESCRIPTION OF THE INVENTION

An improved pintle injector tip for coaxial pintle injector engines may include first and second apertures having substantially different path lengths from the central passageway through the tip material. The shorter path lengths through a relatively thin section of the tip wall may be associated with conventional primary aperture configurations, such as slots. The longer path lengths, through a relatively thicker section of the tip wall, may be associated with secondary apertures and may be positioned nearest the downstream face of the pintle so that the extra length of the path serves to aid in the cooling of the pintle tip. The shorter thermal path between the secondary apertures and the pintle face also contributes to the effectiveness of the cooling. The secondary apertures may conveniently be circular holes drilled through the thick material near the downstream face of the tip in which the diameter of cooling chamber is reduced. The reduced diameter or secondary chamber may be positioned generally in the same place previously used for the conventional conical or similarly shaped diverter. Doublet and/or triplet passageways may also be provided from the reduced diameter cooling chamber through the downstream face of the pintle injector tip in order to make the area adjacent the pintle tip face fuel rich in the central propellant for added cooling. This intentional localized reduction in propellant mixing efficiency causes the hotter areas of combustion to be effectively moved somewhat downstream of the pintle tip face, further decreasing the need for a ablative layer on the pintle tip face.

Figure 1:
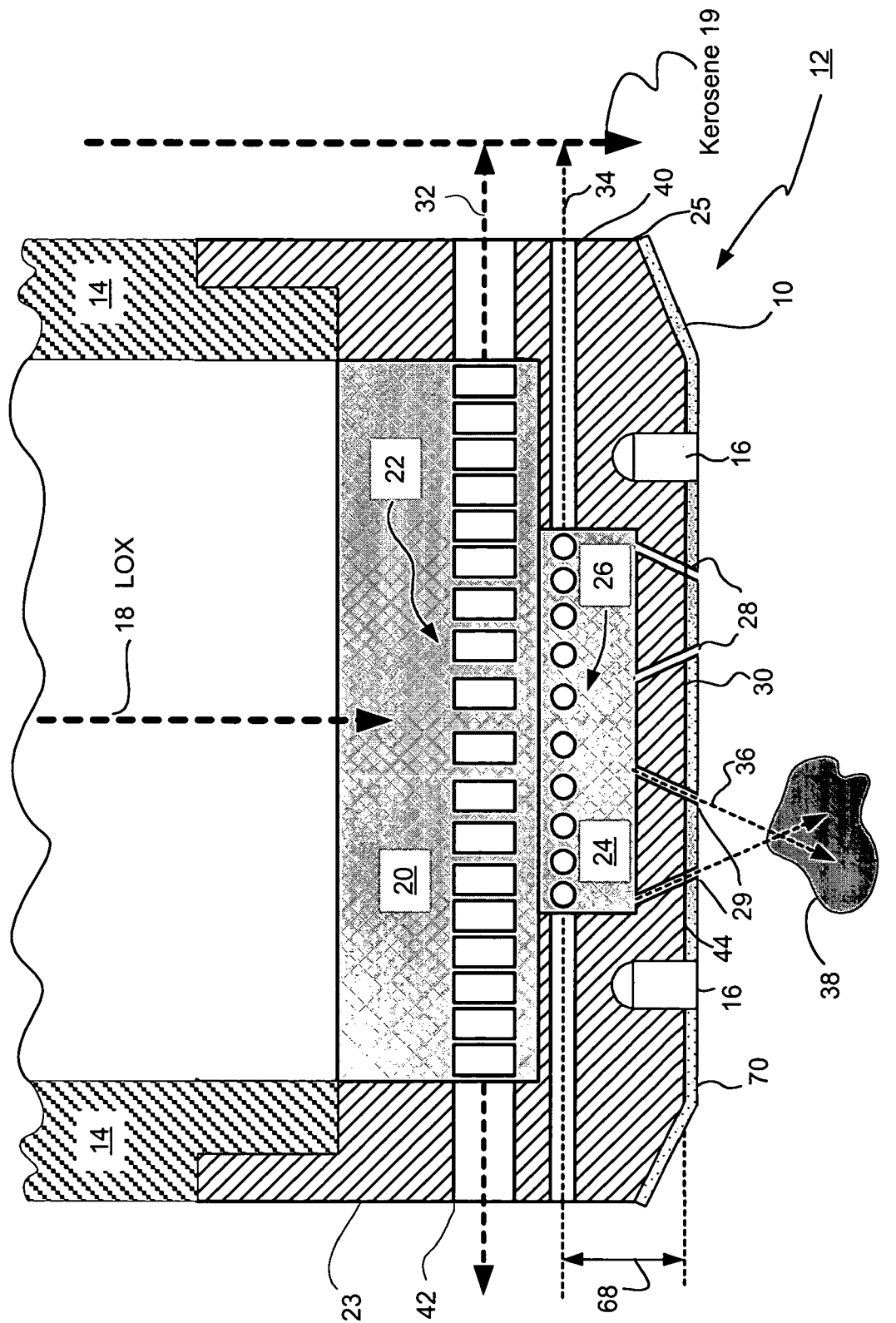
FIG. 1 is a cross sectional view of a pintle injector tip illustrating the active cooling techniques disclosed herein.

Referring now to FIG. 1, pintle injector tip 10 is positioned at the end of the central passageway or pipe 14 of coaxial pintle injector 12 and may be fastened thereto for ease of removal and replacement by conventional means such as machine threads. Dimples 16 may be engaged by a spanner tool, not shown, for ease of loosening and tightening tip 10. A first propellant, such as liquid oxygen or LOX 18, flows through central passageway 14 into primary aperture chamber 20.

The major portion of LOX 18 flowing in pipe 14, perhaps about 60% or 80% of the total flow, exits primary aperture chamber 20 as primary stream 32 through a first row of apertures, primary apertures 22, which penetrate pintle side wall 23. Primary stream 32 forms a series of radial spokes, each passing through one of the primary apertures 22, in a path perpendicular to and radially outward from the axis of flow of LOX 18 in passageway 14 which intersects and mixes with a secondary propellant, such as RP1 or kerosene 19 which is caused to flow along the outer perimeter of pipe 14 by an annular aperture not shown. Primary apertures may be rectangular in cross section as shown in FIG. 1 with the longer side of the rectangle parallel with the axis of pipe 14.

Some portion of LOX 18 flows through primary aperture chamber 20 into primary apertures 22. The remaining portion flows into secondary aperture chamber 24. Secondary aperture chamber 24 may conveniently be formed by a reduced diameter portion of primary aperture chamber 20 so that the wall thickness of pintle sidewall 23 is substantially thicker than the wall thickness in primary chamber 20 which may be on the order of the same wall thickness as pipe 14. A portion of LOX 18, shown as secondary stream 34, exits secondary aperture chamber 20 through a second row of apertures, secondary apertures 26, which penetrate pintle side wall 23. Secondary stream 34 forms a series of radial spokes, each passing through one of the secondary apertures 22, in a path perpendicular to and radially outward from the axis of flow of LOX 18 in passageway 14 to mix with kerosene 19. Combustion of the mixed LOX and kerosene occurs downstream of the mixing of the propellants. Secondary apertures 26 may be circular in cross section because it is generally more convenient to create the longer path through the extended thickness 15 of the pintle sidewall 17 by drilling circular holes for apertures 26 than by techniques used to create rectangular primary orifices 22. Secondary apertures 26 may be rectangular in cross section like the primary apertures 22 to allow flexibility in adjusting parameters such as total aperture area, aspect ratio of the apertures and the total ratio of aperture opening to circumferential area of the pintle tip 10.

A remaining portion of LOX 18 exits secondary aperture chamber 24 through a pattern of apertures, tertiary apertures 28, which penetrate pintle face end wall 30 in a direction generally parallel with the axis of flow of LOX 18. Tertiary apertures 28 may conveniently be in the form of a series of pairs of apertures, such as doublet 29, the paths of which intersect each other downstream of pintle tip face 30 as shown in concentration zone 38. The tertiary streams 36 flowing through doublets 29 form a series of areas of center propellant concentration 38, each passing through two or more of the tertiary apertures 28, causing the combustion to be removed somewhat downstream from pintle tip end wall 30. Convention doublets, triplets and other multiple intersecting apertures are known in the art and may be also used to produce such intersecting streams to cool pintle face 30. The range of flows for the center propellant is 5-10% through tertiary aperture 28 and 15-30% through secondary apertures 26. The remainder flows through the primary apertures 22.

The configuration and operation of primary chamber 20 may conveniently be conventional. In a preferred embodiment, primary apertures 22 are generally rectangular in cross section and sized so that, when combined with secondary apertures, on the order of 50% of the surface area of side wall 23 is penetrated by primary and secondary apertures is open to the flow of primary propellant 18.

In conventional pintle tip designs, the upstream side of pintle end wall 30 is often formed convex to the flow of propellant 18 in which case the convex upstream portion is said to act as a diverter directing the flow of propellant 18 through primary apertures 22 and, if present, secondary apertures 26. Chamber 24 is in the nature of a concave upstream volume, rather than a convex upstream portion. Chamber 24 is substantially smaller in diameter than chamber 20 which extends the length of secondary path 40 through the material of pintle tip 10 for the secondary stream 34 compared to primary path 42 for primary stream 32.

The flow of central propellant 18, such as LOX, through pintle tip 10 serves to cool pintle downstream face 30 by forced convection between the cooler propellant and the hot metal of the body of pintle 10 along secondary paths 40. By reducing the diameter of secondary chamber 24 compared to primary chamber 20, the length of secondary path 40 is made substantially longer than primary path 42 increasing the cooling area which center propellant 18 is in contact with and therefore cooling the material of pintle tip 10. The configuration of the secondary path 40 is located parallel and adjacent to the heated pintle face 30 so that the cooling effectiveness of the secondary paths 40 is maximized and controls the maximum wall temperature of the pintle tip face 30 to an acceptable temperature. Even if the primary apertures had sufficient cooling capacity to carry the heat load from the pintle face 10, the long conduction path from the pintle face to the primary apertures 42 would result in excessively hot temperatures at the pintle face 30.

In a conventional pintle tip, primary and secondary chambers 20 and 24 would typically be merged to form a single chamber. The wall thickness of side wall 23 of pintle tip 10 controls the length of primary path 42. The diameter and sidewall thickness of pintle tip 10, and therefore the diameter of primary chamber 20, is determined from the required flow rate of center propellant 18 through tip 10. The sidewall thickness of tip 10 is limited in practice by the number, shape and size of primary apertures 22. In pintle 10 as shown, the length of secondary path 40 is extended compared to conventional pintle tips by creating secondary chamber 24 with a smaller diameter than primary chamber 20.

In addition to the cooling effect of the additional length of secondary paths 40, with regard to primary paths 42, tertiary apertures 28 in pintle tip downstream face 30 may be used to form doublets, or other multiple converging streams to further aid the cooling of pintle tip 10. As noted above, the primary cooling effect of doublets 29 is to push the combustion zone downstream away from face 30, thereby reducing the heat applied by the combustion to face 30. A secondary cooling effect of doublets 29 is to add addition path length of cooling fluid flowing through pintle tip 10 at face 30 which is typically the hottest part of the pintle tip. Although the path length of each individual tertiary path 44 through pintle face 30 may be short, the total path lengths of all such tertiary passageways may add to the cooling effect by forced convection through the pathways 44.

Thickness 68 of the pintle tip end wall, one face of which is pintle tip face 30, establishes the conduction path for the heat load between convective face heating at 30 and the convective cooling at the apertures 26. Thickness 68 should be established to create thermal resistance to reduce the heat load into the cooling apertures 26, while maintaining a surface temperature at the pintle face 30 that is consistent with the pintle tip material and to achieve acceptable cycle life without thermal fatigue damage. Thermal barrier coatings such as flame or plasma sprayed ceramic coating 70 may be applied to the face 30 to further increase the thermal resistance and reduce the peak temperatures of the pintle tip.

Figure 2:
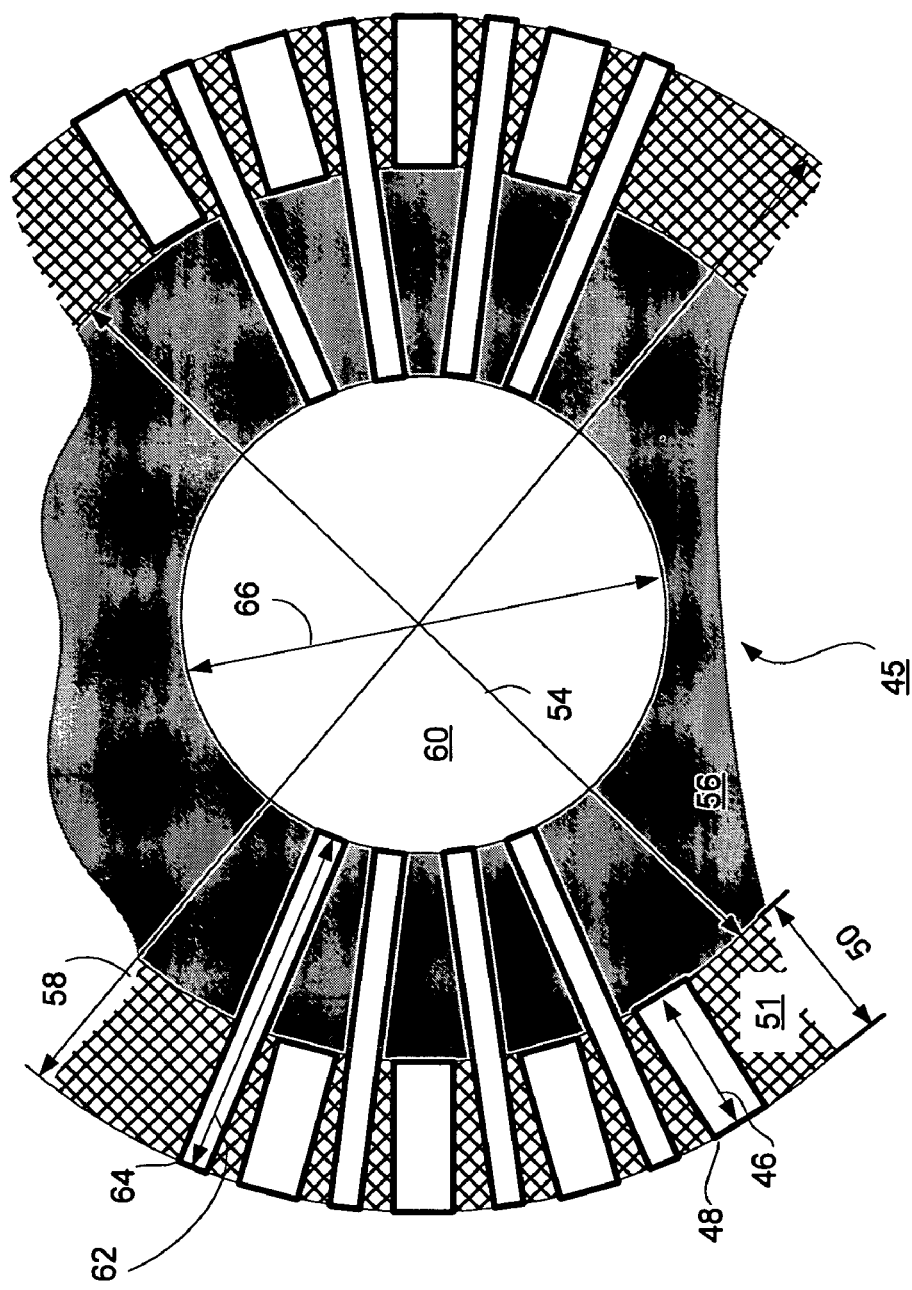
FIG. 2 is a block diagram illustration of a partial top view of the pintle injector tip shown in FIG. 1, illustrating the difference in path lengths of the primary and secondary apertures through the material of the pintle injector tip of FIG. 1.

Referring now to FIG. 2, a block diagram illustration of some of the major elements of the cooling techniques is shown by superimposing a few of the primary and secondary pathways over a portion of the pintle tip sidewall and the primary and secondary aperture chambers. As shown, the secondary pathways may be staggered somewhat from alignment with the primary pathways in order to increase the effectiveness of the mixing of the central and outer propellants.

The partial illustration of pintle 45 shows that the length of pintle primary pathway 46, of primary aperture 48, is generally the same as the thickness 50 of the pintle sidewall 51. Diameter 54 of primary chamber 56 represents the central passageway or flow path for center or inner propellant 18 within the pintle tip and is equal to outside diameter 58 of the pintle tip minus twice thickness 50 of the pintle sidewall 51. Diameter 66 of secondary aperture chamber 60 is substantially smaller than diameter 54 of primary aperture chamber 56. Secondary path length 62 of secondary aperture 64 is therefore substantially longer than primary path length 46 of primary aperture 48. The additional length of secondary path 62 therefore provides additional convection cooling area over conventional configurations and locates the cooling holes adjacent to the pintle face 30 where the maximum heating is encountered.

In order to design a pintle injector rocket engine, the desired thrust is used to determine the total flow of the propellant, from which is derived the flow rate of the center propellant 18. This flow rate is used to determine a minimum area of the center feed passage 14 consistent with design criteria known in the art for manifolding of the upstream of injection apertures. As a result of this manifolding design practice, the cross sectional area of the primary aperture chamber must be sized to provide an area consistently larger than the total area of the injection apertures it feeds. The flow rate of the propellant to the secondary chamber 24 is typically 15% to 30%, and preferably about 20% of the total center propellant flow 18. Accordingly, the circular flow area 60 of the secondary chamber 24 would be 15-30% of the total area of the primary chamber 20. This results in a smaller diameter 60 for the secondary aperture chamber 24, thus allowing the longer path 62 of the secondary apertures, and increasing the effective convective cooling area of the secondary apertures.

The invention claimed is:

1. A pintle tip comprising:
 a central chamber having a first wall thickness and a first plurality of apertures there through so that a first portion of the first liquid exits the central chamber to mix with the second liquid at right angles therewith;
 a secondary chamber downstream of the central chamber having a second wall thickness and a second plurality of apertures there through so that a second portion of the first liquid exits the central chamber to mix with the second liquid at right angles therewith; and
 an end wall downstream of the secondary chamber having a non-ablative tip face adjacent combustion of the mixed first and second liquid propellants,
 wherein the second wall thickness is greater than the first wall thickness so that the portion of the first liquid exiting through the second plurality of apertures cools the non-ablative tip face.

2. The invention of claim 1 wherein the end wall has a third plurality of apertures there through so that a third portion of the first liquid exits the secondary chamber through the non-ablative tip face in parallel with the flow of the second liquid to mix therewith.

3. The invention of claim 2 wherein the flow of the first liquid through the third plurality of apertures causes a zone of concentration of the first liquid downstream of the downstream face of the end wall.

4. The invention of claim 1, wherein the first plurality of apertures are generally rectangular in shape and the second plurality of apertures are generally circular in shape.

* * * * *